United States Patent [19]

Finkenzeller et al.

[11] 4,310,766
[45] Jan. 12, 1982

[54] MOTOR DRIVEN X-RAY GRID AND FILM-HOLDER ASSEMBLY

[75] Inventors: Joahnn Finkenzeller; Günter Holzermer, both of Erlangen, Fed. Rep. of Germany

[73] Assignee: Siemens Aktiengesellschaft, Berlin & Munich, Fed. Rep. of Germany

[21] Appl. No.: 66,848

[22] Filed: Aug. 15, 1979

[30] Foreign Application Priority Data

Sep. 6, 1978 [DE] Fed. Rep. of Germany ....... 2838901

[51] Int. Cl.³ .............................................. A61B 6/00
[52] U.S. Cl. ................................................... 250/509
[58] Field of Search ................................. 250/509, 508

[56] References Cited

U.S. PATENT DOCUMENTS

| | | | |
|---|---|---|---|
| 2,143,799 | 1/1939 | Schönauder et al. | 250/508 |
| 2,767,323 | 10/1956 | Stava et al. | 250/509 |
| 2,938,120 | 5/1960 | Forsyth et al. | 250/509 |
| 3,660,660 | 5/1972 | Pearson et al. | 250/509 |

Primary Examiner—Davis L. Willis
Assistant Examiner—T. N. Grigsby

[57] ABSTRACT

In an exemplary embodiment, an x-ray grid for shielding the film from stray radiation is formed of two U-shaped metal plates with interfitted sections at the respective sides, projecting laterally for coupling the grid to its drive and guidance elements. Known stray radiation grids are mounted in a metal plate frame which is moved by means of the motor drive. The disclosure shows a way by means of which the plate metal frame can be avoided and the structural thickness can be reduced. In a preferred embodiment, one guide section can be brought into releasable positive locking engagement with a support mounting part of the motor drive, and the other guide section is releasably engageable in a channel guideway of the housing, so that the two plates and interfitted sections with their enclosed lead (Pb) lamellae can be quickly removed and replaced when required.

10 Claims, 3 Drawing Figures

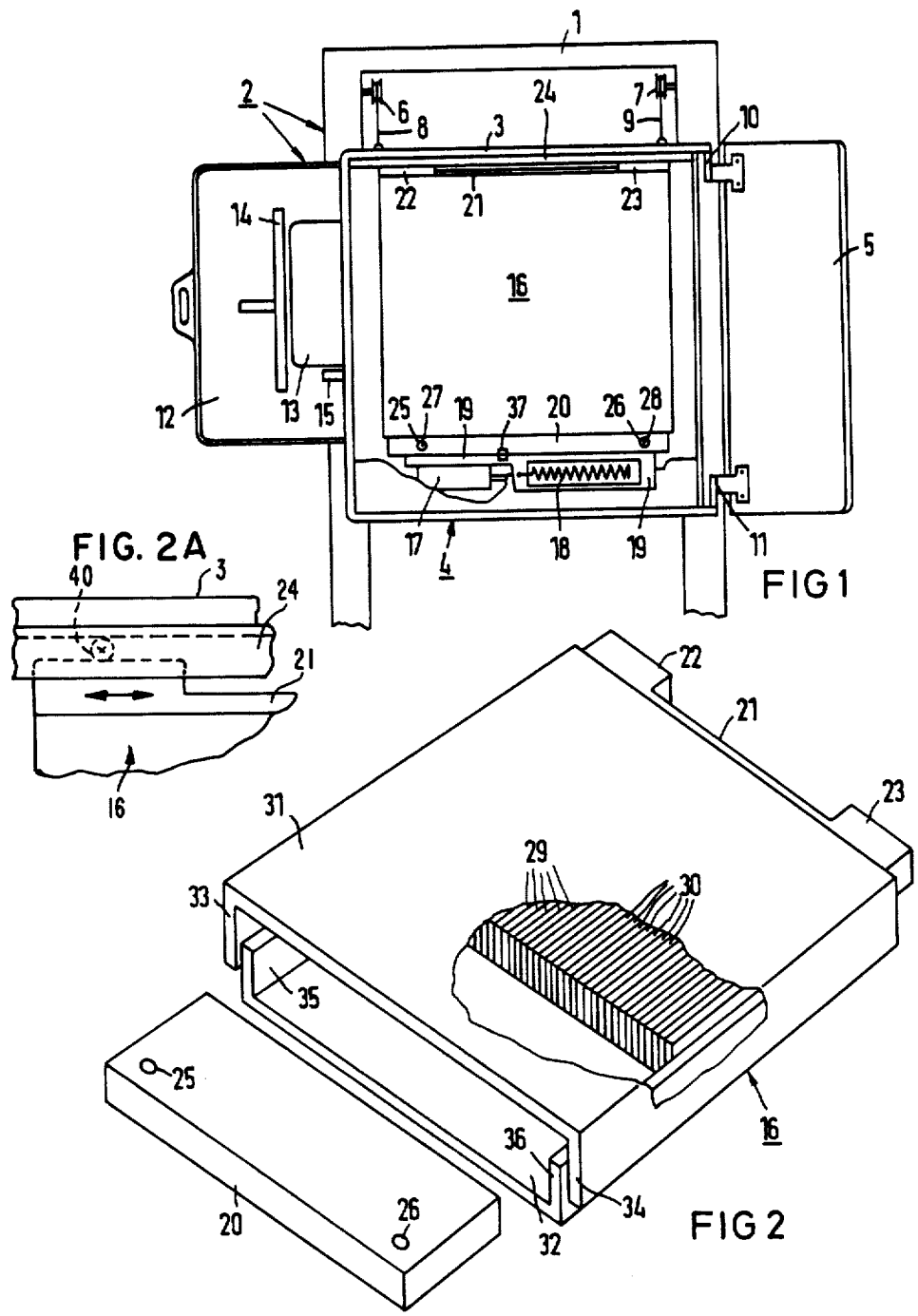

MOTOR DRIVEN X-RAY GRID AND FILM-HOLDER ASSEMBLY

BACKGROUND OF THE INVENTION

The invention relates to an x-ray grid and cassette-mounting arrangement for x-ray examination apparatus comprising rails for a cassette receiving tray and also comprising a mobile stray radiation absorbing grid or grating known as a Bucky diaphragm or a Potter-Bucky grid, together with a motor drive and mounting therefor.

In the case of most x-ray examination apparatus in which the patient can be examined while reclined on a horizontal, more or less tilted, patient support platform or while standing against a support wall, there is disposed in the radiation direction, directly beneath the patient support platform, or directly behind the support wall, respectively, a guide for a cassette plate or tray. In order to obtain x-ray photographs with good detail-recognizability, it is generally known to provide, in the present instance, a motor-driven stray radiation grating or grid between the patient support platform, or the support wall, respectively, and the x-ray film cassette. The motor-driven back and forth movement of the stray radiation grating or grid here prevents an image from being formed of the latter on the x-ray photograph. Nevertheless, the grating absorbs the obliquely directed stray rays which reduce the contrast, and thus improves the photographic quality. Moreover, it is of decisive significance in terms of the photographic quality that the x-ray film and the stray radiation grating be arranged as closely as possible behind the examination subject. Such units comprising a cassette plate or tray, a stray radiation grating, and the respective drive, are offered on the market in Germany as "catapult raster" cases. Such cases or assemblies are installed with the smallest possible distance beneath the patient support in the case of a reclining patient, or behind the support wall in the case of a standing patient.

In the case of the known assemblies of this type, the stray radiation grating, designed for a specific film-to-focus-distance, rests in a plate metal frame which is moved back and forth by means of a motor in the housing of the assembly. In the case of such assemblies, which are inserted behind support walls and in which, on occasion, operation is carried out with a different film to focus distance, the stray radiation grating can be replaced by another stray radiation grating designed for the different film to focus distance to be utilized.

SUMMARY OF THE INVENTION

The object underlying the invention consists in simplifying and reducing the cost of the construction of the assemblies of the foregoing type. At the same time, an improvement in the photographic quality should be achieved.

In the case of an assembly of the type initially cited, accordingly, in accordance with the invention, the stray radiation absorbing grating is provided, at two oppositely disposed edges, with at least one guide section each, whereby the guide section at one edge is capable of being brought into engagement with the motor drive in a positive locking manner, and the guide section at the opposite edge is capable of displacement in a guide of the assembly housing. What is achieved as a consequence of this is that the plate metal frame, in which otherwise the stray radiation grating conventionally is disposed, can be entirely eliminated. As a result, not only are costs saved, but the required constructional thickness is also reduced so that the film cassette can be brought several millimeters closer to the stray radiation grating and to the patient, and the quality of image-formation is improved.

In a particularly advantageous embodiment of the invention, the spaced lamellae or blades of the grid or grating can be cemented between two enveloping metal plates each of which has inturned edges to define a U-formation and which, with their bent edges, engage with one another in a positive locking manner to define a rectangular enclosure for the blades with open ends opening laterally of the direction of movement of the blades. One guide section is inserted into each of the two oppositely disposed open ends and is secured to the enveloping plates so as to form part of the casing for the blades. Through this method of construction, the constructional prerequisite is provided in order to be able to move the stray radiation grid or grating in the assembly housing without a metal plate frame.

In an expedient embodiment of the invention, the motor drive can be provided with pins oriented perpendicularly relative to the displacement direction, and the guide section of the one edge of the stray radiation grid casing is provided with holes adapted to the pins of the motor drive. This has the great advantage that the stray radiation grid can be removed from the assembly housing and replaced without difficulty by means of lifting it out of engagement with the pins of the motor drive.

The full significance of this advantage is apparent if, in an additional expedient embodiment of the invention, the guide section of the stray radiation grid, disposed opposite the motor drive, slides by means of sliding lugs engaging in the guide of the housing. In this case, it is sufficient, for the replacement of the stray radiation grid, to lift out the latter from the pins of the motor drive on the one side, and then to pull it out on its other side from the guides of the assembly housing. The insertion of a new stray radiation grid adapted to the newly adjusted film-to-focus-distance, can proceed in the same simple fashion in inverse sequence. Through this means, an assembly is produced which exhibits improved radiation properties, renders possible an easy replacement of the stray radiation grid, and, finally, is additionally simplified in its constructional outlay.

The invention shall be explained in greater detail on the basis of an exemplary embodiment illustrated on the accompanying sheet of drawings; and other objects, features and advantages will be apparent from this detailed disclosure and from the appended claims.

BRIEF DESCRIPTION OF THE DRAWINGS

FIG. 1 shows a graphic overall view of a wall-type x-ray apparatus with a folded-out support wall or panel and a partially pulled-out cassette mounting plate or tray; and FIG. 2 illustrates a stray radiation absorbing grid, with a portion of one plate broken away, and with a guide section removed from one open end of the interfitting plates, and FIG. 2A illustrates a modification of the arrangement of FIG. 2.

DETAILED DESCRIPTION

In FIG. 1, it is possible to recognize a support frame 1 for a wall apparatus 2, which frame is secured to the wall of the room in a manner not further illustrated here. Along the support frame, the housing 3 of the assembly 4 together with a support wall or panel 5, coupled to the housing 3, is capable of being adjusted in a vertical direction. To this end, the grid and cassette-holder assembly 4 is suspended in an equilibrated (counterbalanced) fashion on two cables 8, 9, guided over respective pulleys 6, 7, and loaded with counterweights (not illustrated). The housing 3 of the assembly 4 is normally covered with the protective wall or panel 5 on the side facing the patient, illustrated in FIG. 1. This support wall 5 is suspended on two hinges 10, 11, in the manner of a door, and in FIG. 1 it is shown folded out, so that the interior of the assembly 4 becomes visible. On the left side of the assembly 4, a cassette tray 12 is represented as being partially pulled out, into which an x-ray film cassette 13 is clamped between clamping jaws such as 14, 15. The cassette case 12 with the clamped-in cassette 13 is disposed in radiation direction, which, in FIG. 1, corresponds to the view direction, directly behind the stray radiation grid 16. Only in the case of such an assembly in which an ionization chamber is utilized can the x-ray exposure measuring means be inserted between the stray radiation grid and the cassette.

At the lower edge of the assembly 4, a drive motor 17 can be recognized which operates counter to a tension spring 18 and by means of which a support mounting part 19 of the motor drive can be displaced (or moved) back and forth in a transverse direction (transverse to the length dimension of blades 29, FIG. 2) via a cam disk (not illustrated). The stray radiation grid 16 is disposed directly behind the support wall or panel 5 which is folded shut in the operating condition of the equipment. The stray radiation grid 16 is provided at its upper and lower end in FIG. 1 with respective guide sections 20, 21. While the upper guide section 21 with its two sliding lugs 22, 23 can slide along a U-rail 24 mounted at the upper edge of the housing 3 of the assembly 4, the lower guide section 20 is provided with two bores 25, 26, which can be inserted onto corresponding pins 27, 28, of the support-mounting part 19 of the motor drive.

FIG. 2 illustrates the construction of the stray radiation grid 16 with the blades or lamellae 29 of lead (Pb) responsible for the stray x-ray absorbing effect. The lead (Pb) lamellae 29 are cemented on edge between two enveloping metal plates 31, 32, which are each bent into a U configuration. The lamellae 29 are spaced apart by the interpositioning of strips 30 of a material which can be readily penetrated by radiation, such as, for example, a cardboard material. The two enveloping plates are disposed with their bent edges 33, 34, 35, 36 in overlapping relationship. One of the guide sections 20, 21 is inserted into each of the two oppositely disposed open ends of the stray radiation grid 16, and said guide sections are cemented as well as riveted to the enveloping plates 31, 32. Whereas the one guide section 20 (illustrated in FIG. 2 in the noninstalled state), bears, at its protruding edge, two bores 25, 26, which are matched in their mutual distance and diameter to the pins 27, 28, of the support mounting part 19 of the motor drive, the other guide section 21 (in FIG. 2, shown installed as part of the stray radiation grid 16), is provided with two extensions which are designed in the form of sliding lugs 22, 23. These sliding lugs 22, 23 are coated with polytetrafluoroethylene in order to reduce the frictional resistance.

Through the installation of the two guide sections 20, 21, application or engagement points 25, 26 are formed on the stray radiation grid 16 by means of which it can be moved back and forth in the assembly 4 without the assistance of a plate metal frame. The bores 25, 26 of the one guide section 20, serves the purpose of transmitting the drive forces, whereas the sliding lugs 22, 23, of the other guide section 21 merely serve the purpose of guidance of the stray radiation grid 16 in the assembly 4. This design of the stray radiation grid 16 facilitates the rapid exchange of the stray radiation grid when the film to focus distance is to be altered, which occasionally occurs in the case of x-ray wall apparatus. In this instance, the stray radiation grid 16 can be rapidly exchanged for another stray radiation grid which is matched to the newly selected film to focus distance. To this end, the lower guide section 20, after the support wall or panel 5 has been folded out, need only be removed from the pins 27, 28, and, with its upper guide section 21, be removed from the upper U-rail 24 of the housing 3 of the assembly 4. In order to prevent an inadvertent slipping out of the stray radiation grid 16 from the pins 27, 28 of the support mounting part 19, a latch 37 is provided on the support mounting part 19 which, in the normal or rest state, snaps in front of the lower guide section 20.

The utilization of the stray radiation grid 16 with upper and lower guide sections such as 20 and 21 permits the omission of the plate metal frame in which otherwise stray radiation grids are conventionally mounted. As a consequence, not only is the metal plate thickness of the plate frame economically dispensed with; the additional tolerance distances necessary for the plate frame are also economically dispensed with. Finally, the cassette 13 can, in this fashion, be brought closer to the support wall or panel 5 of the x-ray wall apparatus 2. At the same time, the omission of the plate frame as well as the utilization of enveloping metal plates 31, 32, which require only a simple bending, represent economizing features which are welcome in the fabrication process.

It will be apparent that many modifications and variations may be effected without departing from the scope of the novel concepts and teachings of the present invention, for example FIG. 2A is a diagrammatic illustration of an alternative where the guide means 24 for the stray radiation grid 16 comprise rollers such as 40 for the guide section 21.

We claim as our invention:

1. An x-ray grid and cassette mounting assembly for an x-ray examination apparatus, comprising a housing with receiving means for receiving a cassette holder, and grid guide means, a stray radiation grid for guidance by said grid guide means, and motor drive means for effecting movement of the stray radiation grid along said grid guide means, characterized in the stray radiation grid (16) having at respective sides thereof respective guide section (20, 21), the motor drive means comprising a motor drive (17) and a support mounting part (19) driven thereby, the guide section (20) at one of the sides of said grid being positionable in positive locking engagement with the support mounting part (19) of the motor drive means (17, 19), and the guide section (21) at the other side of said grid being displaceable in said grid guide means (24) of the housing (3), and further characterized in the grid (16) having metal plates (31, 32) with inturned edges to define U-shaped configurations, and having spaced lamellae (29) cemented between said metal plates (31, 32), the plates (31, 32) providing respective laterally directed open sides receiving the respective guide sections (20, 21), and said guide sections being secured with said metal plates (31, 32), to effectively enclose said lamellae (29) on all sides thereof.

2. An assembly according to claim 1, characterized in that the support mounting part (19) is provided with pins (27, 28), which are oriented perpendicularly to the displacement direction, and the guide section (20) of the one side of the stray radiation grid (16) being provided with openings (25, 26) matched to the pins of the support mounting part for positive locking engagement therewith.

3. An assembly according to claim 1, characterized in that the guide sections (20, 21) are cemented in planar conforming engagement to the metal plates (31, 32).

4. An assembly according to claim 1, characterized in that the guide sections (20, 21) are riveted to the metal plates (31, 32).

5. An assembly according to claim 1, characterized in that the guide means (24) for the stray radiation grid (16) is secured with the receiving means for the cassette holder (12).

6. An assembly according to claim 1, characterized in that guides provide for vertical adjustment of the housing (3).

7. An assembly according to claim 1, with said grid (16) consisting essentially of two metal plates (31, 32), the two guide sections (21, 22) and lamallae (29) of radiation absorbing material secured therewith, for removal and replacement as a unit.

8. An assembly according to claim 1, characterized in that the guide means (24) for the stray radiation grid (16) comprise rollers for the guide section (21).

9. An assembly according to claim 1, characterized in that the guide section (21) of the stray radiation grid (16), which guide section is opposite the support mounting part (19), has sliding means (22, 23) slidable in the grid guide means (24) of the housing (3).

10. An assembly according to claim 9, characterized in that the sliding means (22, 23) of the guide section (21) are coated with polytetrafluoroethylene.

* * * * *